Patented Sept. 23, 1952

2,611,754

UNITED STATES PATENT OFFICE 2,611,754

VINYL ACETATE-ALLYL ACETATE COPOLYMER EMULSION

Hyman Rudoff, Springfield, Mass., assignor to Shawinigan Resins Corporation, Springfield, Mass., a corporation of Massachusetts No Drawing. Application November 30, 1948, Serial No. 62,781

3 Claims. (Cl. 260—29.6)

This invention relates to aqueous emulsions of vinyl acetate-allyl acetate copolymers.

It is well known to subject aqueous emulsions of many polymerizable materials to polymerizing conditions for the purpose of preparing aqueous emulsions of polymers thereof. However, attempts to prepare aqueous emulsions of copolymers of vinyl acetate and allyl acetate containing 5–45% allyl acetate by weight have met with considerable difficulty. Thus, on heating an aqueous emulsion of a mixture of vinyl acetate and allyl acetate in which the allyl acetate constitutes 5–45% by weight of the polymerizable materials, a very slow polymerization takes place. The product which is obtained is deficient in several respects and even on long continued heating, the yields are poor.

It is an object of this invention to provide aqueous emulsions of allyl acetate-vinyl acetate copolymers having an allyl acetate content of 5–45% by weight.

A particular object of this invention is to provide an improved process for polymerizing mixtures of vinyl acetate and allyl acetate in an aqueous emulsion.

These and other objects are accomplished according to this invention by polymerizing a substantially equi-molecular mixture of vinyl acetate and allyl acetate while emulsified in an aqueous medium and thereafter adding and polymerizing therein sufficient vinyl acetate to increase the amount of vinyl acetate in the copolymer to 55–95% by weight of the sum of the vinyl acetate and the allyl acetate.

The following examples are illustrative of the present invention, but are not to be construed as limitative thereof. Where parts are given, they are parts by weight.

Example I

| | Parts |
|---|---|
| Vinyl acetate | 42 |
| Allyl acetate | 49 |
| Water | 264 |
| Polyvinyl alcohol | 18 |
| Sodium sulfonate of dioctyl succinate | 0.45 |
| Potassium persulfate | 3.6 |
| Sodium bicarbonate | 0.3 |

The above ingredients are placed in a suitable vessel equipped with an agitator and a water-cooled return condenser. The mixture is heated with vigorous agitation to reflux temperature (about 70° C.) and the heating continued at the reflux temperature until the exothermic reaction subsides as indicated by a drop in the rate of reflux. Thereafter, an additional 235 parts of vinyl acetate are added at a substantially uniform rate over a period of about four hours. During the same period, 0.1 part of hydrogen peroxide dissolved in 10 parts of water is added at a substantially uniform rate. The temperature during this period is raised from about 70° C. to about 90° C.

The product obtained according to the above process is an aqueous emulsion of the vinyl acetate-allyl acetate copolymer in which the polymer particles have a diameter of about 0.2 mu. Despite the exceedingly small size of the polymer particles, the emulsion has such an exceedingly high viscosity that pouring is difficult. In this respect the emulsion of the example differs greatly from the usual polyvinyl acetate emulsions which have a relatively low viscosity and flow very easily. It is found that on forming films from the emulsion of Example I on glass, metal or other suitable surfaces and allowing the films to dry, the resulting coatings are exceedingly clear and retain considerable strength and resistance to rubbing after immersion in water. The emulsion of Example I may be used as an adhesive for adhering layers of wood together and for other purposes for which polyvinyl acetate emulsions are adapted.

Example II

| | Parts |
|---|---|
| Vinyl acetate | 42 |
| Allyl acetate | 49 |
| Sodium sulfonate of dioctyl succinate | 0.5 |
| Polyvinyl alcohol | 15 |
| Potassium persulfate | 4 |
| Water | 300 |

The above ingredients are placed in a suitable vessel, equipped with an agitator and a water-cooled return condenser. The mixture is heated with vigorous agitation to reflux temperature (about 70° C.) and the heating continued at the reflux temperature until the exothermic reaction subsides, as indicated by a drop in the rate of reflux. Thereafter, an additional 240 parts of vinyl acetate are added and the heating continued at the reflux temperature until the polymerization is substantially complete, i. e., less than 1% of unpolymerized material remains.

The emulsion obtained in this example has substantially the same characteristics as the emulsion of Example I. The average size of the polymer particles is somewhat larger than in the product of Example I, but otherwise the emulsion and the polymer contained therein have the characteristic properties of the product of Example I.

Numerous variations may be introduced into the invention as illustrated by the examples. Thus, the proportion of allyl acetate in the copolymer may be varied, as pointed out above, from 5 to 45% on a weight basis, and particularly valuable results are obtained in preparing copolymers containing 10–25% allyl acetate. In preparing the emulsions of the invention, substantially equi-molar proportions, i. e., 0.8–1.2 mols of vinyl acetate for each mol of allyl acetate are initially polymerized and the remaining vinyl acetate is introduced after the initial exothermic reaction subsides. The remaining vinyl acetate may be added all at once or at a slow rate, e. g., at the rate at which it polymerizes. Emulsions made by the latter method are characterized by especially small polymer particles.

Surprisingly, it is found that by carrying out the emulsion copolymerization in this manner, emulsions are readily obtained with the unusual and advantageous characteristics pointed out above with respect to the product of the examples. In contrast, if attempts are made to copolymerize initially all of the vinyl acetate with the allyl acetate poor results are obtained as indicated above.

Numerous other variations may be introduced into the process of the invention as illustrated by the specific examples. For example, other polymerizing temperatures may be used, the exact temperature depending in part on the nature of the polymer desired. However, temperatures between 60° C. and 100° C. are usually employed.

Various water-soluble per compounds may be used in place of the per compounds employed in the examples, such as per-acetic acid, sodium perborate, potassium perborate, sodium persulfate, sodium peroxide, potassium peroxide, urea peroxide and the like. The amount employed is usually such as to contain 0.001–0.1 part of available oxygen for every 100 parts of water. In some instances mixtures of two or more per compounds may be used as in Example I.

The surface tension depressants or wetting agents used in preparing the emulsions may be one or more of the well known wetting agents, as for example, anionic, cationic, or non-ionic wetting agents, such as the alkali metal, ammonium and amine salts of long chain fatty acids, for example, sodium oleate, sodium palmitate, potassium stearate, Marseilles soap, diethanol amine laurate; alkali metal sulfonates of aliphatic or alkyl-aromatic hydrocarbons of high molecular weight, such as the alkyl naphthalene sulfonic acids, for example, isobutyl naphthalene sulfonic acid; sodium lauryl sulfate; salts of sulfonates of alkyl esters of dicarboxylic acids, for example, the sodium salt of dioctyl sulfo-succinate (Aerosol O. T.); wetting agents marketed under the following trade names, Nekals, particularly, Nekal BX High Concentration (sodium diisobutyl naphthalene sulfonate); Santomerse, e. g., Santomerse #3 (dodecyl benzene sodium sulfonate) and Santomerse D (decyl benzene sodium sulfonate), Aresklene (sodium disulfonate of dibutyl phenyl phenol), Tergitols (sodium sulfonate of higher synthetic secondary alcohols), Invadine N (sodium alkyl polyether alcohols), Emulsol 607 (quaternary ammonium derivative of the pyridine betaine type made from a blend of fatty acids).

Generally, it is to be preferred that the surface tension depressants used be resistant to hydrolysis under the conditions of polymerization. Thus, particularly preferred for polymerizing under acid conditions is the class of wetting agents characterized by containing a sulfonate group and one or more long chain alkyl groups, i. e., alkyl chains having 6–18 carbon atoms as exemplified by Santomerse #3 and the sodium sulfonate of dioctyl succinate, etc.

Examples of suitable hydrophilic colloids which may be used in the process of the invention include polyvinyl alcohol and partially hydrolyzed polyvinyl acetate soluble in the reaction medium in the amount used. These colloids are especially suitable when they are made from polyvinyl acetate having a viscosity of over 7 centipoises as determined in a 1-molar benzene solution at 20° C. Other suitable colloids are soluble starch, soluble starch degradation products, e. g., Stayco M, the methyl ether of cellulose, water-soluble glycol cellulose, gum tragacanth, gum acacia, sodium alginate, agar-agar, gum tragon, gum arabic, glue, gelatine, Gomagel, Cellosize WS (hydroxy ethyl cellulose), sodium carboxy methyl cellulose and the like.

In some instances the colloid may also function sufficiently well as a wetting agent so that a single substance may combine both functions. An example is gum arabic which may be used in the absence of a separate wetting agent.

The amount of wetting agent may be substantially varied. Large amounts of such materials are usually undesirable since they may adversely affect the characteristics of the product. On the other hand, a certain minimum is necessary for proper stability of the emulsion both during and after polymerization. Usually 0.01 part to 2.0 parts and preferably, 0.1–1 part of a wetting agent per 100 parts of water are found to be suitable. From 1 to 10 parts of the colloid for every 100 parts of water are usually employed.

In making aqueous emulsions of polymerized vinyl compounds according to the process of the invention, the ratio of water to polymerizable compound may be varied substantially. Generally, weight ratios of water to polymerizable compound of between 60:40 and 40:60 are used. Usually, the weight ratio of water to polymerizable compound is not lower than 30:70, since the viscosity of the polymerizing mixture becomes too high to permit adequate agitation, nor higher than 90:10 largely for reasons of economy.

By the term "dispersing agent" as used in the claims is meant both a mixture of a hydrophilic colloid and a wetting agent, and a single material having both functions.

It is obvious that many variations may be made in the products and processes of this invention without departing from the spirit and scope thereof as defined in the appended claims.

What is claimed is:

1. A process which comprises emulsifying in water a mixture of 0.8–1.2 molecular proportions of vinyl acetate and one molecular proportion of allyl acetate in the presence of a dispersing agent, heating the resulting emulsion to cause substantially complete copolymerization of the acetates as indicated by the exothermic reaction subsiding, then adding sufficient additional vinyl acetate to raise the total amount thereof to 95–55 parts by weight for every 5–45 parts by weight of allyl acetate and heating the resultant mixture until the copolymer contains at least 55% vinyl acetate by weight.

2. A process which comprises emulsifying in water a mixture of 0.8–1.2 molecular proportions of vinyl acetate and one molecular proportion of allyl acetate in the presence of a dispersing agent, heating the resulting emulsion to cause substantially complete copolymerization of the acetates as indicated by the exotheric reaction subsiding, then adding sufficient additional vinyl acetate to raise the total amount thereof to 90–75 parts by weight for every 10–25 parts by weight of allyl acetate and heating the resulting mixture until the copolymer contains at least 75% vinyl acetate by weight.

3. An aqueous emulsion as prepared by the process defined in claim 1.

HYMAN RUDOFF.

REFERENCES CITED

The following references are of record in the file of this patent:

UNITED STATES PATENTS

| Number | Name | Date |
| --- | --- | --- |
| 2,395,649 | Wagner | Feb. 26, 1946 |
| 2,404,817 | Strain | July 30, 1946 |
| 2,420,330 | Shriver | May 13, 1947 |
| 2,424,838 | Moffett | July 29, 1947 |